(12) United States Patent
Nakano et al.

(10) Patent No.: US 6,770,709 B2
(45) Date of Patent: Aug. 3, 2004

(54) RESIN COMPOSITION

(75) Inventors: Yoshio Nakano, Yokkaichi (JP); Shigeru Murata, Suzuka (JP); Shohei Konishi, Tokyo (JP); Iwao Hotta, Yokkaichi (JP)

(73) Assignee: Kyowa Yuka Co., Ltd., Tokyo (JP)

( * ) Notice: Subject to any disclaimer, the term of this patent is extended or adjusted under 35 U.S.C. 154(b) by 0 days.

(21) Appl. No.: 10/312,619

(22) PCT Filed: Jun. 29, 2001

(86) PCT No.: PCT/JP01/05622

§ 371 (c)(1),
(2), (4) Date: Dec. 27, 2002

(87) PCT Pub. No.: WO02/00788

PCT Pub. Date: Jan. 3, 2002

(65) Prior Publication Data

US 2003/0125452 A1 Jul. 3, 2003

(30) Foreign Application Priority Data

Jun. 29, 2000 (JP) .................... 2000-195475

(51) Int. Cl.$^7$ .................. C08F 216/36; C08F 216/34
(52) U.S. Cl. ............... 524/592; 524/593; 524/560; 524/602; 525/220; 525/328.8; 525/330.5; 525/374; 525/376; 525/382
(58) Field of Search ................ 524/560, 592, 524/602, 593; 525/220, 328.8, 330.5, 374, 376, 382

(56) References Cited

U.S. PATENT DOCUMENTS

| | | | | |
|---|---|---|---|---|
| 4,267,091 A | | 5/1981 | Geelhaar et al. | 260/29.6 |
| 5,767,188 A | * | 6/1998 | Kamikuri et al. | 524/507 |
| 6,063,861 A | * | 5/2000 | Irle et al. | 524/591 |
| 6,242,515 B1 | * | 6/2001 | Zhao et al. | 524/190 |
| 6,512,042 B1 | * | 1/2003 | Fischer et al. | 524/558 |
| 6,555,625 B1 | * | 4/2003 | Overbeek et al. | 525/191 |
| 6,610,784 B1 | * | 8/2003 | Overbeek et al. | 525/178 |
| 2002/0147262 A1 | * | 10/2002 | Kriessmann et al. | 524/458 |

FOREIGN PATENT DOCUMENTS

| | | |
|---|---|---|
| EP | 0 995 780 | 4/2000 |
| JP | 50-17213 | 6/1975 |
| JP | 11-172168 | 6/1999 |
| JP | 11-293068 | 10/1999 |
| JP | 11-349828 | 12/1999 |
| JP | 2000-191881 | 7/2000 |

* cited by examiner

*Primary Examiner*—David W. Wu
*Assistant Examiner*—Satya Sastri
(74) *Attorney, Agent, or Firm*—Fitzpatrick, Cella, Harper & Scinto

(57) ABSTRACT

The present invention provides a resin composition comprising:

(1) a vinyl copolymer obtained from a starting material containing vinyl monomer (a) which comprises at least one carbonyl group or aldehyde group and vinyl monomer (b) which is different from vinyl monomer (a) and capable of copolymerization;

(2) a hydrazide derivative represented by general formula (I):

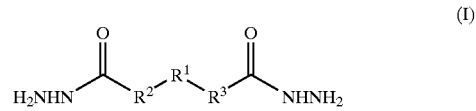

(I)

(wherein $R^1$ represents substituted or unsubstituted phenylene, substituted or unsubstituted cyclohexylene or alkylene; and $R^2$ and $R^3$, which may be the same or different, each represent a single bond or alkylene) or a hydrazide derivative in which the amino group(s) of the hydrazide derivative represented by general formula (I) are protected with a low molecular carbonyl compound; and (3) a polyamine compound represented by general formula (II):

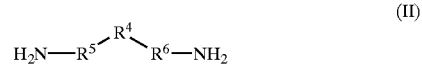

(II)

(wherein $R^4$ represents substituted or unsubstituted phenylene, substituted or unsubstituted cyclohexylene or alkylene; and $R^5$ and $R^6$, which may be the same or different, each represent a single bond or alkylene) or the polyamine compound in which the amino group(s) of the polyamine compound represented by general formula (II) are protected with a low molecular carbonyl compound.

10 Claims, No Drawings

RESIN COMPOSITION

TECHNICAL FIELD

The present invention relates to resin compositions excellent in crosslinking efficiency, solvent resistance or water resistance, which are useful for paints, adhesives, ink, or the like.

BACKGROUND ART

Compositions comprising a vinyl copolymer having a carbonyl group and a polyhydrazide are known as resins of ordinary temperature-crosslinking type useful for paints, adhesives, or the like.

For example, Japanese Published Examined Patent Application. No. 20991/83 discloses an aqueous resin emulsion prepared by adding a compound having at least two hydrazine residues in the molecule to an emulsion comprising carbonyl groups obtained by copolymerizing monomers having a carbonyl group. The emulsion has an excellent property of being capable of crosslinking at ordinary temperatures and useful as a one-liquid paint.

However, paint films formed from aqueous resin emulsions prepared using adipic dihydrazide and succinic dihydrzide as disclosed in the examples of the above publication are defective in that they have poor solvent resistance, water resistance and weatherability.

Japanese Published Examined Patent Application No. 17213/75 discloses a thermosetting coating composition comprising a copolymer obtained by reacting a polyamine with a vinyl copolymer prepared from a vinyl monomer having a carbonyl group in the molecule and other vinyl monomer, and an aminoplast resin and/or an epoxy resin.

DISCLOSURE OF THE INVENTION

An object of the present invention is to provide a resin composition which gives a cured resin excellent in crosslinking efficiency, solvent resistance, water resistance or mechanical properties.

The present invention provides a resin composition comprising:
(1) a vinyl copolymer obtained from a starting material containing vinyl monomer (a) which comprises at least one carbonyl group or aldehyde group and vinyl monomer (b) which is different from vinyl monomer (a) and capable of copolymerization;
(2) a hydrazide derivative represented by general formula (I):

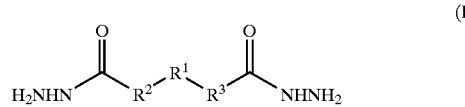

(I)

(wherein $R^1$ represents substituted or unsubstituted phenylene, substituted or unsubstituted cyclohexylene or alkylene; and $R^2$ and $R^3$, which may be the same or different, each represent a single bond or alkylene) or a hydrazide derivative in which the amino group(s) of the hydrazide derivative represented by general formula (I) are protected with a low molecular carbonyl compound; and (3) a polyamine compound represented by general formula (II):

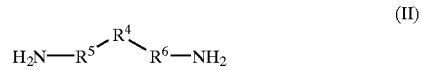

(II)

(wherein $R^4$ represents substituted or unsubstituted phenylene, substituted or unsubstituted cyclohexylene or alkylene; and $R^5$ and $R^6$, which may be the same or different, each represent a single bond or alkylene) or the polyamine compound in which the amino group(s) of the polyamine compound represented by general formula (II) are protected with a low molecular carbonyl compound.

Hereinafter, the hydrazide derivative represented by general formula (I) and the polyamine compound represented by general formula (II) may be referred to merely as the hydrazide derivative and the polyamine compound, respectively.

Also, the vinyl copolymer obtained from a starting material containing vinyl monomer (a) which comprises at least one carbonyl group or aldehyde group and vinyl monomer (b) which is different from vinyl monomer (a) and capable of copolymerization may be referred to as the vinyl copolymer of the present invention.

The present invention is described in detail below.

In the definitions of the groups in general formulae (I) and (II), the alkylene includes straight-chain or branched alkylene groups having 1 to 12 carbon atoms, such as methylene, ethylene, propylene, butylene, pentylene, hexylene, heptylene, octylene and dodecylene.

The substituted phenylene and the substituted cyclohexylene each have 1 to 4 substituents. Examples of the substituents include lower alkyl and halogen atoms. The lower alkyl includes straight-chain or branched alkyl groups having 1 to 8 carbon atoms, such as methyl, ethyl, propyl, isopropyl, butyl, isobutyl, sec-butyl, tert-butyl, pentyl, hexyl, heptyl and octyl. The hologen atoms include fluorine, chlorine, bromine and iodine.

The preferred hydrazide derivatives are those wherein $R^1$ is alkylene, and $R^2$ and $R^3$ are single bonds. The preferred polyamine compounds are those wherein $R^4$ is alkylene, and $R^5$ and $R^6$ are single bonds.

Hereinafter % means wt %, unless otherwise specified. The term (meth)acrylate means methacrylate and acrylate. Similarly, each (meth)acrylic acid derivative means a methacrylic acid derivative and an acrylic acid derivative.

For producing the vinyl copolymer used in the present invention, vinyl monomer (a) comprising at least one carbonyl group or aldehyde group [hereinafter it may be referred to as monomer (a)] is used. Monomer (a), which serves as a component enabling crosslinking when introduced into a polymer, is a monomer comprising at least one carbonyl group or aldehyde group and a double bond capable of polymerization. Preferred monomers (a) are those in which the moiety of the carbonyl group is not a carboxyl group, a carbamoyl group or an ester group.

Specific examples of monomer (a) include acrolein, diacetone (meth)acrylamide, formylstyrol, vinyl methyl ketone, vinyl isobutyl ketone, (meth)acrylamide pivalic aldehyde, diacetone (meth)acrylate, acetonyl (meth)acrylate, 2-hydroxypropyl (meth)acrylate acetylacetate, acetoacetoxyethyl (meth)acrylate, butanediol-1-(meth)acrylate-4-acetylacetate, (meth)acrylamide methylanisaldehyde and (meth)acryloyloxypropanal derivatives represented by the following general formula (III):

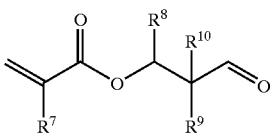

(III)

(wherein $R^7$, $R^8$, $R^9$ and $R^{10}$, which may be the same or different, each represent a hydrogen atom or lower alkyl).

The lower alkyl has the same significance as defined above.

The preferred (meth)acryloyloxypropanal derivatives represented by general formula (III) are those in which $R^7$, $R^8$, $R^9$ and $R^{10}$ are alkyl having 1 to 4 carbon atoms.

Among the above-described monomers (a), acrolein, diacetone acrylamide and vinyl methyl ketone are preferred. Monomer (a) may be used singly, or two or more kinds of monomers (a) may be used in combination. Vinyl copolymers obtained by the use of two or more kinds of monomers (a) are also included in the vinyl copolymers used in the present invention.

Vinyl monomer (b) capable of copolymerization used for the production of the vinyl copolymer used in the present invention [hereinafter it may be referred to as monomer (b)] can be arbitrarily selected depending upon the purpose from those having at least one double bond capable of polymerization in the molecule.

Specific examples of monomer (b) include alkyl (meth) acrylates formed from an alcohol having 1 to 18 carbon atoms and (meth)acrylic acid, such as methyl (meth) acrylate, ethyl (meth)acrylate, n-butyl (meth)acrylate, isobutyl (meth)acrylate, tert-butyl (meth)acrylate, cyclohexyl (meth)acrylate, 2-ethylhexyl (meth)acrylate, lauryl (meth) acrylate and stearyl (meth)acrylate; aromatic vinyl compounds such as styrene, α-methylstyrene and p-methylstyrene; hydroxyalkyl (meth)acrylates such as 2-hydroxyethyl (meth)acrylate and 2-hydroxypropyl (meth) acrylate; glycol di(meth)acrylates such as ethylene glycol di(meth)acrylate and butanediol (meth)acrylate; alkylaminoalkyl (meth)acrylates such as dimethylaminoethyl (meth) acrylate; vinyl monomers comprising fluorine such as trifluoroethyl (meth)acrylate, pentafluoropropyl (meth) acrylate, perfluorocyclohexyl (meth)acrylate, 2,2,3,3-tetrafluoropropyl (meth)acrylate and β-(perfluorooctyl)ethyl (meth)acrylate; vinyl monomers comprising siloxane such as 1-[3-(meth)acryloxypropyl]-1,1,3,3,3-pentamethyldisiloxane, 3-(meth)acryloxypropyltris (trimethylsiloxane)silane and AK-5 (silicon macromonomer, Toa Gosei Kagaku Kogyo Co., Ltd.); vinyl monomers comprising a hydrolyzable silyl group such as vinyltrimethoxysilane, vinylmethyldimethoxysilane, 3-(meth)acryloxypropyltrimethoxysilane, 3-(meth) acryloxypropylmethyldimethoxysilane, 3-(meth) acryloxypropyltriethoxysilane and 3-(meth) acryloxypropyldiethoxysilane; α, β-ethylenic unsaturated carboxylic acids such as acrylic acid, methacrylic acid, maleic acid, maleic anhydride, itaconic acid, itaconic anhydride, crotonic acid, fumaric acid and citraconic acid; vinyl monomers comprising an epoxy group such as glycidyl (meth)acrylate and vinyl monomers obtained by reaction of a carboxylic acid having a polymerizable double bond (e.g., fumaric acid, maleic acid, maleic anhydride, linseed oil fatty acid, tall oil fatty acid and dehydrated castor oil fatty acid) with an epoxy resin or an epoxy compound; vinyl ethers such as vinyl methyl ether, vinyl ethyl ether and vinyl isobutyl ether; polybasic unsaturated carboxylic acids (e.g., fumaric acid, maleic acid, maleic anhydride, linseed oil fatty acid, tall oil fatty acid and dehydrated castor oil fatty acid), or monovalent or polyvalent alcohol esters thereof; and known vinyl monomers such as dimethylaminoethyl (meth)acrylate methyl chloride, allyl (meth)acrylate, trimethylolpropane tri(meth)acrylate, glycidyl (meth)acrylate, vinyl acetate, vinyl propionate, (meth)acrylonitrile, and macromonomers AS-6, AN-6, AA-6 and AB-6 (Toa Gosei Kagaku Kogyo Co., Ltd.)

A monomer obtained by introducing to vinyl monomer (b) an acidic group or a basic group [may be referred to as monomer (b-1)] may also be employed; the use of monomer (b-1) followed by neutralization of the introduced acidic group or basic group confers water solubility on the polymer obtained. Examples of the acidic groups include a carboxyl group, a sulfo group and a phosphono group, and examples of the basic groups include primary, secondary and tertiary amino groups. The neutralizers used for neutralization of the introduced acidic group or basic group include basic compounds such as inorganic bases (e.g., sodium hydroxide, potassium hydroxide and sodium carbonate), ammonia, alkylamines (e.g., trimethylamine, triethylamine and tributylamine), alcoholamines (e.g., dimethylethanolamine and diethanolamine), polyvalent amines (e.g., ethylenediamine and diethylenetriamine), and nitrogen-containing heterocyclic compounds (e.g., morpholine and pyridine), and acidic compounds such as inorganic acids (e.g., hydrochloric acid and sulfuric acid), organic acids (e.g., formic acid, acetic acid, propionic acid, butyric acid and valeric acid) and phenol.

There is no specific restriction as to the amount of monomer (b-1) to be used, which varies depending upon the kind and amount of other monomers etc., but it is usually 0.005 to 3.0 mmol/g, preferably 0.01 to 2.0 mmol/g based on the total amount of the monomers used.

Monomer (b) may be used singly, or two or more kinds of monomers (b) may be used in combination. Vinyl copolymers obtained by the use of two or more kinds of monomers (b) are also included in the vinyl copolymers used in the present invention.

The proportions of monomers (a) and (b) to total vinyl monomers in the starting material for the vinyl copolymer used in the present invention are preferably 0.1 to 30% and 99.9 to 70%, more preferably 1 to 10% and 99 to 90%, respectively. When the proportion of monomer (a) is 0.1% or above, the obtained product is excellent in crosslinking efficiency, solvent resistance or water resistance, and when it is 30 wt % or below, the paint films formed from the product are not brittle.

The vinyl copolymer used in the present invention can be produced by copolymerizing monomers (a) and (b) by known polymerization methods, for example, suspension polymerization, solution polymerization, emulsion polymerization and bulk polymerization. Preferred is emulsion polymerization because the polymerization reaction mixture containing the copolymer can be used, as such, as an aqueous dispersion.

Emulsion polymerization can be carried out according to known methods, usually by using an emulsifier and a polymerization initiator. Also useful are a known method for obtaining a dispersion of the core-shell type by changing the monomer composition in the layers of a multilayered polymerization emulsion, and powerfeed polymerization in which the monomer composition is gradually changed.

Emulsifiers include anionic ones, cationic ones, nonionic ones and high molecular ones. Specific examples of the emulsifiers include, but are not limited to, anionic surfactants such as higher alcohol sulfates, alkylbenzenesulfonates, polyoxyethylene alkyl ether sulfates and polyoxyethylene alkylphenol ether sulfates, and nonionic surfactants such as polyoxyethylene alkylphenol ethers, an ethylene oxide propylene oxide block polymer and sorbitan derivatives. Examples of the high moleculer emulsifiers include polyvinyl alcohol and hydroxyethyl cellulose. The amount of the emulsifier to be used can be appropriately decided depending upon the kind of monomers etc. without any specific restriction, but it is usually 0.1 to 10% based on the total amount of the vinyl monomers used.

The polymerization initiators to be used include persulfates such as potassium persulfate and ammonium persulfate, peroxides such as hydrogen peroxide, benzoyl peroxide, cumene hydroperoxide and tert-butyl hydroperoxide, and azo compounds such as azobisisobutyronitrile. Preferred are redox initiators which are combinations of the above initiator with a reducing component such as a metal ion, sodium sulfite and a mercaptan having reducing action. The polymerization initiator is usually used in an amount of 0.1 to 5.0 mol % based on the total amount of the vinyl monomers used.

In the emulsion polymerization, chain-transfer agents such as n-dodecylmercaptan, tert-dodecylmercaptan or α-methylstyrene dimer may be used, if necessary. There is no specific restriction as to the temperature for polymerization, but it is usually 40 to 100° C., preferably 60 to 90° C.

It is preferable to adjust the dispersion of the vinyl copolymer obtained by emulsion polymerization to pH 6.5 to 9.5 with a base after the polymerization in order to impart stability thereto. Examples of the bases include ammonia, triethylamine, propylamine, dibutylamine, amylamine, 1-aminooctane, 2-dimethylaminoethanol, ethylaminoethanol, 2-diethylaminoethanol, 1-amino-2-propanol, 2-amino-1-propanol, 3-amino-1-propanol, 1-dimethylamino-2-propanol, 3-dimethylamino-l-propanol, 2-propylaminoethanol, ethoxypropylamine, aminobenzyl alcohol, morpholine, sodium hydroxide and potassium hydroxide.

For the production of the vinyl copolymer by solution polymerization, any solvent that dissolves the monomers and polymers used in the present invention can be employed. Specific examples of the solvents include alcohols such as methanol, ethanol, propanol, isopropanol and butanol, glycols such as ethyl Cellosolve, Cellosolve acetate, butyl Cellosolve, butyl Carbitol and propylene glycol methyl ether, acetates such as ethyl acetate and butyl acetate, and ketones such as methyl ethyl ketone and methyl isobutyl ketone.

The reaction temperature for solution polymerization is usually 40° C. to the boiling point of the solvent.

In the solution polymerization, polymerization initiators similar to those described above or chain-transfer agents similar to those described above may be employed.

It is preferable that the resin composition of the present invention contains water, and in that case the vinyl copolymer used in the present invention is preferably dispersed in water (an aqueous dispersion) or dissolved in water or a mixture of water and a solvent (a water-soluble resin).

When the vinyl copolymer used in the present invention is dispersed in water in the resin composition of the present invention, the glass transition temperature (Tg) of the vinyl copolymer is preferably −10 to 50° C., more preferably 0 to 35° C. When Tg is −10° C. or above, paint films formed from the obtained composition are excellent in hardness or blocking resistance. When Tg is 50° C. or below, the obtained composition is excellent in adhesion to a material to which it is applied. Tg of the vinyl copolymer can be adjusted by changing the kind and ratio of vinyl monomers.

The weight-average molecular weight of the vinyl copolymer used in the present invention is preferably 10,000 to 2,000,000, more preferably 80,000 to 1,500,000. When the molecular weight is 10,000 or more, paint films formed from the obtained composition are excellent in strength, impact resistance, etc. When the molecular weight is 2,000,000 or less, the obtained composition is excellent in film formation. The weight-average molecular weight of the vinyl copolymer is usually measured by gel permeation chromatography, or the like.

The aqueous dispersion or water-soluble resin comprising the vinyl copolymer used in the present invention can be obtained by adding, after the polymerization reaction for copolymerization of monomers (a) and (b), water, a solvent, an emulsifier, etc. to the polymerization reaction mixture, if necessary. Any solvent can be used so long as the polymer is stable in the water-soluble resin or aqueous dispersion. Examples of the solvents include those used in the above-described solution polymerization. The amount of the solvent is not specifically restricted, but it is preferably 30 wt % or less based on water.

As the emulsifier, the above-described anionic ones, cationic ones, nonionic ones or high-molecular ones can be used. The emulsifier is used in an amount of 0.1 to 10% based on the vinyl copolymer used in the present invention. When the vinyl copolymer used in the present invention is dispersed in water, the dispersion preferably contains a 30 to 70% solid content (polymer). When the solid content is 30% or more, paint films having a sufficient thickness can be easily formed from the obtained composition, and when the solid content is 70% or less, the obtained composition has a low viscosity and is easy to handle.

In cases where the vinyl copolymer is produced using, as monomer (b), an α, β-ethylenic unsaturated carboxylic acid such as acrylic acid, methacrylic acid, maleic acid, maleic anhydride, itaconic acid, itaconic anhydride, crotonic acid, fumaric acid or citraconic acid, a hydroxyalkyl (meth) acrylate such as 2-hydroxyethyl (meth)acrylate or 2-hydroxypropyl (meth)acrylate, a glycol di(meth)acrylate such as ethylene glycol di(meth)acrylate or butanediol (meth)acrylate, an alkylaminoalkyl (meth)acrylate such as dimethylaminoethyl (meth)acrylate, a vinyl monomer comprising an epoxy group such as glycidyl (meth)acrylate, or a vinyl monomer comprising a hydrolyzable silyl group such as vinyltrimethoxysilane, vinylmethyldimethoxysilane, 3-(meth)acryloxypropyltrimethoxysilane, 3-(meth)acryloxypropylmethyldimethoxyilane, 3-(meth)acryloxypropyltriethoxysilane or 3-(meth)acryloxypropyldiethoxysilane, the obtained vinyl copolymer can be bound to other polymer, as may be required. The vinyl copolymers bound to other polymer are also included in the vinyl copolymers used in the present invention. There is no specific restriction as to the other polymer to which the vinyl copolymer is bound, so long as it has a functional group capable of binding to the vinyl copolymer. Examples of the other polymers include alkyd resins, polyester resins, acryl resins, epoxy resins, polyurethane resins, nylon resins, polydimethylsiloxane, polyvinyl alcohol, polyvinylamine, polybutadiene resins, melamine resins, phenol resins and water-soluble cellulose ethers. The preferred polymers are those having the weight-average molecular weight of 500 to 200,000. It is possible to adjust the water solubility of the vinyl copolymer used in the present invention by using a polymer having water solubility as the other polymer to be bound.

The hydrazide derivative can be purchased as a commercially available product, or can be obtained by synthesis according to a known method.

For example, the hydrazide derivative can be obtained by reacting a dialkyl ester of a dicarboxylic acid with a hydrazine derivative by a known method [Org. Synth., IV, 819 (1963)]. The dialkyl ester of a dicarboxylic acid as a starting material can be purchased as a commercially available product.

The polyamine compound can be usually purchased as a commercially available product.

When the resin composition of the present invention is intended for use as a one-liquid paint or adhesive, the hydrazide derivative and the polyamine compound may be used in the form of a derivative in which the amino group(s) are protected with a low molecular carbonyl compound in order to improve the storage stability of the composition. The preferred low molecular carbonyl compounds are those having 3 to 10 carbon atoms. The term "amino group" as used herein refers not only to amino groups in the polyamine compound but also to amino groups positioned at the end of hydrazido groups in the hydrazide derivative.

When the hydrazide derivative or the polyamine compound in which the amino group(s) are protected with a low molecular carbonyl compound is used, such hydrazide derivative or polyamine compound may be previously prepared by reacting the above hydrazide derivative or polyamine compound with a low molecular compound such as a monoaldehyde or a monoketone according to a known method, for example, the method described in Japanese Published Unexamined Patent Application No. 38468/85. Alternatively, the monoaldehyde or monoketone, and the hydrazide derivative or polyamine compound may be added to a solution containing the vinyl copolymer used in the present invention. Preferred monoaldehydes and monoketones are those having the boiling point of 30 to 200° C., for example, monoaldehydes such as acetaldehyde, propionaldehyde, butylaldehyde and benzaldehyde, and monoketones such as acetone, methyl ethyl ketone, diethyl ketone, isopropyl methyl ketone, cyclohexanone and acetophenon. The low molecular carbonyl compound is usually used in an amount of 5 equivalents or more based on the amino groups in the hydrazide derivative or polyamine compound.

The resin composition of the present invention can be obtained by adding to the vinyl copolymer used in the present invention the hydrazide derivative or the hydrazide derivative in which the amino group(s) of the former hydrazide derivative are protected with a low molecular carbonyl compound, and the polyamine compound or the polyamine compound in which the amino group(s) of the former polyamine compound are protected with a low molecular weight carbonyl compound, followed by mixing or the like. There is no specific restriction as to the order or method of addition, or the like.

In the present invention, the hydrazide derivative or the hydrazide derivative in which the amino group(s) of the former hydrazide derivative are protected with a low molecular weight carbonyl compound, and the polyamine compound or the polyamine compound in which the amino group(s) of the former polyamine compound are protected with a low molecular carbonyl compound are used in such an amount that the total amount of the amino groups and imino groups becomes preferably 0.1 to 10 equivalents, more preferably 0.2 to 2 equivalents, further preferably 0.2 to 1.5 equivalents, most preferably 0.5 to 1.2 equivalents based on the total amount of carbonyl groups and aldehyde groups in the vinyl copolymer used in the present invention. When the ratio of the amino groups and imino groups to the total amount of carbonyl groups and aldehyde groups is 0.1 equivalent or more, the resin composition is improved in solvent resistance or water resistance, and the ratio is 10 equivalents or less, the composition is economically advantageous. The term "imino group" as used herein refers to amino groups in the hydrazide derivative or polyamine compound protected with a low molecular carbonyl compound.

The preferable ratio (equivalent ratio) of the hydrazide derivative or the hydrazide derivative in which the amino group(s) of the former hydrazide derivative are protected with a low molecular carbonyl compound to the polyamine compound or the polyamine compound in which the amino group(s) of the former polyamine compound are protected with a low molecular carbonyl compound is usually 1/99 to 99/1, preferably 5/95 to 70/30, more preferably 10/90 to 60/40.

The resin composition of the present invention may comprise small quantities of known aqueous dispersions for coating, such as a urethane emulsion [e.g., Neolets, ICI Resins; Suncure, BF Goodrich], an acryl silicon emulsion or a fluorine emulsion, or water-soluble resins such as a water alkyd resin, a water acryl resin or polyvinyl alcohol. Crosslinking agents for these resins such as a melamine resin or a water-soluble isocyanate may also be contained in the composition.

When the hydrazide derivative and the polyamine compound are used, the resin composition of the present invention can be cured usually by drying at room temperature to around 100° C. When the hydrazide derivative in which the amino group(s) are protected with a low molecular carbonyl compound and the polyamine compound in which the amino group(s) are protected with a low molecular compound are used, the curing temperature is preferably 20 to 200° C., more preferably 50 to 80° C.

When the resin composition of the present invention is used as a paint, various coloring agents such as an organic pigment or an inorganic pigment, an ultraviolet absorbent, a pigment dispersant, a leveling agent, a thickener, etc. can be added, if necessary. A pigment may be dispersed by means of a paint shaker, a ball mill, or the like using a dispersant, or a commercially available processed pigment which has undergone dispersion can also be used.

The paint of the present invention prepared by using the hydrazide derivative and the polyamine compound is preferably used as a two-liquid paint comprising a component containing the vinyl copolymer used in the present invention and a component comprising the hydrazide derivative and the polyamine compound, and the paint of the present invention prepared by using the hydrazide derivative in which the amino group(s) of the above hydrazide derivative are protected with a low molecular carbonyl compound and the polyamine compound in which the amino group(s) of the above polyamine compound are protected with a low molecular carbonyl compound is preferably used as a one-liquid paint.

The paint comprising the resin composition of the present invention has a low viscosity and can be applied to general brushing and spray coating. The paint can be cured under a wide range of conditions, for example, by drying at ordinary temperatures or drying by heating. The preferred materials to be painted include metals, woods, plastics, inorganic materials, concrete and asphalt.

The cured resin obtained by curing the resin composition of the present invention is excellent in crosslinking efficiency, solvent resistance, water resistance or mechanical properties.

BEST MODES FOR CARRYING OUT THE INVENTION

Examples, comparative examples and reference examples of the present invention are shown below. The terms "part" and "%" used in these examples mean part by weight and wt %, respectively, unless otherwise specified.

REFERENCE EXAMPLE 1

Synthesis of an Aqueous Dispersion

Deionized water (470 g) was poured into a 1-L separable flask equipped with a thermo-regulator, a reflux tube, a nitrogen tube and a stirring motor, and was heated to 70° C. in a water bath.

Aqualon HS-10 (13.5 parts, Dai-ichi Kogyo Seiyaku Co., Ltd.) was mixed with vinyl monomers [diacetone acrylamide (DAAM, 10.4 parts), methyl methacrylate (MMA, 188.6 parts), butyl acrylate (BA, 230.6 parts) and methacrylic acid (MAA, 6.9 parts)] in a beaker to prepare a vinyl monomer mixture.

Separately, 0.8 g of ammonium persulfate was dissolved in 80.0 g of deionized water in another beaker.

When the temperature of the deionized water in the separable flask reached 70° C., two-tenths of the previously prepared vinyl monomer mixture and then the whole of the aqueous solution of ammonium persulfate were added thereto. After the initial polymerization, the rest of the vinyl monomer mixture was added dropwise in two hours. After the completion of dropping, the resulting mixture was heated to 80° C., followed by aging for 2 hours. Then the mixture was cooled, adjusted to pH 9.0 with aqueous ammonia, and filtered through a 100-mesh filter cloth. The solid content of the obtained aqueous dispersion of vinyl polymer was 44.9 wt %.

EXAMPLE 1

To the aqueous dispersion obtained in Reference Example 1 (100 parts) were added adipic dihydrazide (ADH, 0.41 part) and 1,6-diaminohexane (DAH, 0.09 part) to obtain an aqueous resin composition (the proportion of components was adjusted so that the total amount of the amino groups became 1.0 molar equivalent based on one mole of the carbonyl groups in the aqueous dispersion obtained in Reference Example 1).

EXAMPLES 2 and 3

The components shown in Table 1 were mixed in a manner similar to that in Example 1 to obtain resin compositions.

TABLE 1

Proportion of components in resin compositions of Examples 1–3 and Comparative Examples 1 and 2

|  | Example 1 | Example 2 | Example 3 | Comp. Ex. 1 | Comp. Ex. 2 |
|---|---|---|---|---|---|
| Adipic dihydrazide (ADH) | 0.41 | 0.27 | 0.14 | 0.54 | — |
| 1,6-Diamino-hexane (DAH) | 0.09 | 0.18 | 0.27 | — | 0.36 |
| Aqueous dispersion | 100 | 100 | 100 | 100 | 100 |

(unit: part)

COMPARATIVE EXAMPLE 1

To the aqueous dispersion obtained in Reference Example 1 (100 parts) was added adipic dihydrazide (ADH, 0.54 part) to obtain an aqueous resin composition (the proportion of components was adjusted so that the amount of the amino groups became 1.0 molar equivalent based on one mole of the carbonyl groups in the aqueous dispersion obtained in Reference Example 1).

COMPARATIVE EXAMPLE 2

To the aqueous dispersion obtained in Reference Example 1 (100 parts) was added 1,6-diaminohexane (DAH, 0.36 part) to obtain an aqueous resin composition (the proportion of components was adjusted so that the amount of the amino groups became 1.0 molar equivalent based on one mole of the carbonyl groups in the aqueous dispersion obtained in Reference Example 1).

Each of the aqueous resin compositions of Examples 1 to 3 and Comparative Examples 1 and 2 was applied to a zinc phosphate-treated steel plate and a glass plate using bar coater No. 126 and dried at room temperature for 7 days to obtain paint films. The obtained paint films were evaluated by the following methods. The results of the evaluation are shown in Table 2.

Pencil hardness:

The pencil hardness test prescribed in JISK 5400 was carried out using samples applied to zinc phosphate-treated steel plates. Evaluation was made based on the destruction of the paint film.

Adhesiveness:

The cross-cut test prescribed in JISK 5400 was carried out using samples applied to zinc phosphate-treated steel plates. That is, a paint film was cross cut at intervals of 1 mm, and an adhesive tape was stuck to the plate and then removed. Evaluation was made based on the number of squares on which the film remained in 100 squares according to the following criterion.

◎: Area where film remains: 90% or more

○: Area where film remains: from 50% (inclusive) to 90% (exclusive)

X: Area where film remains: below 50%

Crosslinking Degree:

A paint film (about 1 g) was precisely weighed and subjected to Soxhlet extraction under reflux using tetrahydrofuran. The extraction residue was precisely weighed and the percentage of its weight to that of the starting paint film was calculated as the gel fraction. Evaluation was made according to the following criterion.

◎: Gel fraction: 90% or more

○: Gel fraction: from 50% (inclusive) to 90% (exclusive)

X: Gel fraction: below 50%

Solvent Resistance:

The rubbing test was carried out by rubbing the surface of a sample applied to a zinc phosphate-treated steel plate using xylene-soaked gauze with a 500-gram load. Evaluation was made based on the number of reciprocal rubbing motions required for exposing the surface of the plate according to the following criterion.

◎: 70 times or more

○: from 40 times (inclusive) to 70 times (exclusive)

X: below 40 times

Water Resistance:

The water resistance test was carried out according to the method of JISK 5400. That is, a sample applied to a glass plate was soaked in water (23° C.) in a tank. After 72 hours, the glass plate was taken out and its appearance was visually observed. Evaluation was made according to the following criterion.

⊚: No change observed

○: A little opacity observed

X: Opacity observed

Warm Water Resistance:

A sample applied to a glass plate was soaked in water (50° C.) in a tank. After 24 hours, the glass plate was taken out and its appearance was visually observed.

Evaluation was made according to the following criterion.

⊚: No change observed

○: A little opacity observed

X: opacity observed

Mechanical Properties:

A paint film (thickness: 100 μm) applied to a glass plate was stripped off the plate to prepare a rectangular test piece (5×50 mm). The conditions of the tensile test apparatus (autograph) were as follows: tensile speed, 50 mm/minute; distance between bench marks, 10 mm; distance between chucks, 40 mm. Measurement of tensile strength and elongation was carried out (no measurement was carried out on the composition of Example 3).

TABLE 2

Results of the evaluation of paint films

|  | Example 1 | Example 2 | Example 3 | Comp. Ex. 1 | Comp. Ex. 2 |
|---|---|---|---|---|---|
| Pencil hardness | H | H | H | H | H |
| Adhesiveness | ⊚ | ⊚ | ⊚ | ⊚ | ⊚ |
| Crosslinking degree | ⊚ | ⊚ | ⊚ | ⊚ | X |
| Solvent resistance | ⊚ | ⊚ | ⊚ | ⊚ | X |
| Water resistance | ⊚ | ⊚ | ⊚ | X | ⊚ |
| Warm water resistance | ⊚ | ⊚ | ⊚ | X | ⊚ |
| Tensile strength (Mpa) | 11.8 | 11.6 | — | 10.5 | 3.2 |
| Elongation (%) | 339 | 374 | — | 294 | 338 |

It can be seen from Table 2 that the cured resins obtained by curing the resin compositions of the present invention are excellent in crosslinking efficiency, solvent resistance, water resistance and mechanical properties.

INDUSTRIAL APPLICABILITY

The present invention provides a resin composition which gives a cured resin excellent in crosslinking efficiency, solvent resistance, water resistance or mechanical properties.

What is claimed is:

1. A resin composition comprising:

(1) a vinyl copolymer obtained from a starting material containing vinyl monomer (a) which comprises at least one carbonyl group or aldehyde group and a different vinyl monomer (b) which is capable of copolymerization;

(2) a hydrazide derivative represented by formula (I):

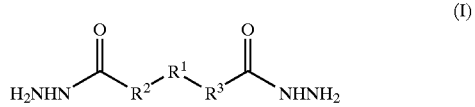

(wherein $R^1$ represents substituted or unsubstituted phenylene, substituted or unsubstituted cyclohexylene or alkylene; and $R^2$ and $R^3$ independently represent a single bond or alkylene) in which any of the amino groups are optionally protected with a low molecular carbonyl compound; and (3) a polyamine compound represented by formula (II):

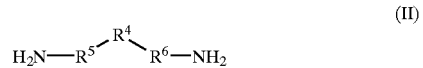

(wherein $R^4$ represents substituted or unsubstituted phenylene, substituted or unsubstituted cyclohexylene or alkylene; and $R^5$ and $R^6$ independently represent a single bond or alkylene) in which any of the amino groups are optionally protected with a low molecular carbonyl compound.

2. The resin composition according to claim 1, which contains water.

3. The resin composition according to claim 1, wherein the vinyl copolymer is dispersed in water.

4. The resin composition according to any of claims 1 to 3, wherein the vinyl copolymer is obtained by copolymerizing vinyl monomer (a) and vinyl monomer (b), or is obtained by further binding that copolymer to other polymer.

5. The resin composition according to claim 4, wherein the vinyl copolymer is obtained by further binding that copolymer to other polymer, and said other polymer is an alkyd resin, a polyester resin, an acryl resin, an epoxy resin, a polyurethane resin, a nylon resin, polydimethylsiloxane, polyvinyl alcohol, polyvinylamine, a polybutadiene resin, a melamine resin, a phenol resin or a water-soluble cellulose ether.

6. The resin composition according to any of claims 1 to 3, wherein the total amount of amino acid groups and imino groups in the hydrazide derivative or its derivative in which the amino group(s) are protected with a low molecular carbonyl compound and the polyamine compound or its derivative in which the amino group(s) are protected with a low molecular carbonyl compound is 0.1 to 10 equivalents based on the total amount of carbonyl groups and aldehyde groups in the vinyl copolymer.

7. The resin composition according to any of claims 1 to 3, wherein the proportions of vinyl monomer (a) and vinyl monomer (b) to total vinyl monomers in the starting material for the vinyl copolymer are 0.1 to 30 wt % and 70 to 99.9 wt %, respectively.

8. A cured resin obtained by curing the resin composition according to any of claims 1 to 3.

9. A paint comprising the resin composition according to any of claims 1 to 3.

10. A paint kit comprising two separate components:

(A) a component comprising a vinyl copolymer obtained from a starting material containing vinyl monomer (a) which comprises at least one carbonyl group or aldehyde group and a different vinyl monomer (b) which is capable of copolymerization; and (B) a component comprising (i) a hydrazide derivative represented by formula (I):

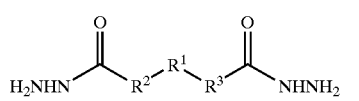

(I)

(wherein $R^1$ represents substituted or unsubstituted phenylene, substituted or unsubstituted cyclohexylene or alkylene: and $R^2$ and $R^3$ independently represent a single bond or alkylene) in which any of the amino groups are optionally protected with a low molecular carbonyl compound: and (ii) a polyamine compound represented by formula (II):

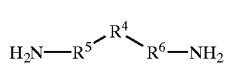

(II)

(wherein $R^4$ represents substituted or unsubstituted phenylene, substituted or unsubstituted cyclohexylene or alkylene: and $R^5$ and $R^6$ independently represent a single bond or alkylene) which any of the amino groups are optionally protected with a low molecular carbonyl compound.

* * * * *

UNITED STATES PATENT AND TRADEMARK OFFICE
CERTIFICATE OF CORRECTION

PATENT NO. : 6,770,709 B2
DATED : August 3, 2004
INVENTOR(S) : Yoshio Nakano et al.

It is certified that error appears in the above-identified patent and that said Letters Patent is hereby corrected as shown below:

Column 1,
Line 27, "drzide" should read -- drazide --.

Column 2,
Line 17, "merely" should be deleted; and
Line 39, "hologen" should read -- halogen --.

Column 6,
Line 49, "acryloxypropylmethyldimethoxyilane," should read
--acryloxypropylmethyldimethoxysilane, --.

Column 12,
Line 34, "other" should read -- another --; and
Line 37, "to other" should read -- to another --.

Column 14,
Line 10, "which" should read -- in which --.

Signed and Sealed this

Seventh Day of December, 2004

JON W. DUDAS
*Director of the United States Patent and Trademark Office*